US008712757B2

(12) United States Patent
Hamilton, II et al.

(10) Patent No.: US 8,712,757 B2
(45) Date of Patent: Apr. 29, 2014

(54) METHODS AND APPARATUS FOR MONITORING COMMUNICATION THROUGH IDENTIFICATION OF PRIORITY-RANKED KEYWORDS

(75) Inventors: Rick A. Hamilton, II, Charlottesville, VA (US); Peter G. Finn, Brampton (CA); Christopher J. Dawson, Arlington, VA (US); John S. Langford, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 857 days.

(21) Appl. No.: 11/621,729

(22) Filed: Jan. 10, 2007

(65) Prior Publication Data

US 2008/0168168 A1 Jul. 10, 2008

(51) Int. Cl.
*G06F 17/27* (2006.01)
(52) U.S. Cl.
USPC ............. 704/9; 704/251; 704/244; 704/235; 704/231; 715/738; 715/203; 715/201; 455/416; 379/93.01; 379/93.26; 709/224; 709/204
(58) Field of Classification Search
CPC ... G01L 15/265; G01L 15/1815; G01L 15/22; G01L 15/063; G06F 17/30893; G06F 17/30017; G06F 17/30867; G06Q 30/0255; G06Q 30/0269; H04H 60/46
USPC .................... 704/270, 224, 9, 275; 707/725; 709/224, 206, 207
See application file for complete search history.

(56) References Cited

U.S. PATENT DOCUMENTS

| 5,717,869 | A | * | 2/1998 | Moran et al. .................. 715/716 |
| 5,732,216 | A | * | 3/1998 | Logan et al. .................. 709/203 |
| 5,894,306 | A | * | 4/1999 | Ichimura ....................... 345/418 |
| 5,960,447 | A |   | 9/1999 | Holt et al. |
| 6,490,553 | B2 | * | 12/2002 | Van Thong et al. ........... 704/211 |
| 6,507,838 | B1 | * | 1/2003 | Syeda-Mahmood ................. 1/1 |
| 6,567,506 | B1 |   | 5/2003 | Kermani |

(Continued)

FOREIGN PATENT DOCUMENTS

WO WO 01/58165 A 8/2001

OTHER PUBLICATIONS

Schultz et al. "The ISL Meeting Room System", 2001.*

(Continued)

*Primary Examiner* — Michael Colucci
(74) *Attorney, Agent, or Firm* — Wolf, Greenfield & Sacks, P.C.

(57) ABSTRACT

A method for communication management includes receiving at least one keyword and receiving a replay time span input. Further, the method includes receiving a plurality of communication inputs including at least a first communication input and a second communication input, monitoring at least the first communication input and second communication input for the at least one keyword, and determining an instantiation of the at least one keyword in at least one of the first communication input and second communication input. Additionally, the method includes associating the determined instantiation with one of the first communication input and second communication input, and providing at least a portion of the communication associated with the determined instantiation based on the replay time span input responsive to the instantiation.

6 Claims, 3 Drawing Sheets

(56) References Cited

U.S. PATENT DOCUMENTS

| | | | |
|---|---|---|---|
| 6,651,042 B1* | 11/2003 | Field et al. | 704/270 |
| 6,697,796 B2 | 2/2004 | Kermani | |
| 6,847,977 B2* | 1/2005 | Abajian | 1/1 |
| 6,961,700 B2 | 11/2005 | Mitchell et al. | |
| 7,039,585 B2 | 5/2006 | Wilmot et al. | |
| 7,047,192 B2* | 5/2006 | Poirier | 704/235 |
| 7,260,771 B2* | 8/2007 | Chiu et al. | 715/201 |
| 7,287,223 B2* | 10/2007 | Smoliar et al. | 715/704 |
| 7,298,930 B1* | 11/2007 | Erol et al. | 382/305 |
| 7,324,636 B2* | 1/2008 | Sauvage et al. | 379/201.01 |
| 7,519,661 B2* | 4/2009 | Slotznick | 709/204 |
| 7,530,020 B2* | 5/2009 | Szabo | 715/738 |
| 7,634,406 B2* | 12/2009 | Li et al. | 704/244 |
| 7,664,641 B1* | 2/2010 | Pettay et al. | 704/251 |
| 7,701,456 B1* | 4/2010 | Buck | 345/440 |
| 7,818,168 B1* | 10/2010 | Cusmariu | 704/209 |
| 7,852,992 B1* | 12/2010 | Edamadaka et al. | 379/67.1 |
| 8,121,269 B1* | 2/2012 | Hession et al. | 379/93.01 |
| 8,478,589 B2* | 7/2013 | Begeja et al. | 704/231 |
| 8,521,510 B2* | 8/2013 | Gilbert et al. | 704/9 |
| 2002/0002562 A1 | 1/2002 | Moran et al. | 707/500 |
| 2002/0099696 A1* | 7/2002 | Prince | 707/3 |
| 2003/0154072 A1* | 8/2003 | Young et al. | 704/9 |
| 2003/0189603 A1* | 10/2003 | Goyal et al. | 345/863 |
| 2004/0021765 A1* | 2/2004 | Kubala et al. | 348/14.08 |
| 2004/0081296 A1* | 4/2004 | Brown et al. | 379/88.14 |
| 2004/0128353 A1* | 7/2004 | Goodman et al. | 709/204 |
| 2004/0184586 A1* | 9/2004 | Coles et al. | 379/88.14 |
| 2004/0193428 A1* | 9/2004 | Fruchter et al. | 704/276 |
| 2004/0228463 A1* | 11/2004 | Sauvage et al. | 379/202.01 |
| 2004/0246331 A1 | 12/2004 | Caspi et al. | |
| 2005/0021713 A1* | 1/2005 | Dugan et al. | 709/223 |
| 2005/0227680 A1* | 10/2005 | Snowden | 455/416 |
| 2005/0262428 A1* | 11/2005 | Little et al. | 715/501.1 |
| 2006/0047518 A1* | 3/2006 | Claudatos et al. | 704/275 |
| 2006/0184538 A1* | 8/2006 | Randall et al. | 707/10 |
| 2006/0190809 A1* | 8/2006 | Hejna, Jr. | 715/500.1 |
| 2007/0033003 A1* | 2/2007 | Morris | 704/9 |
| 2007/0050187 A1* | 3/2007 | Cox | 704/9 |
| 2007/0106724 A1* | 5/2007 | Gorti et al. | 709/204 |
| 2007/0127704 A1* | 6/2007 | Marti et al. | 379/373.01 |
| 2007/0143103 A1* | 6/2007 | Asthana et al. | 704/200 |
| 2007/0263805 A1* | 11/2007 | McDonald | 379/93.26 |
| 2008/0086303 A1* | 4/2008 | Sengamedu | 704/231 |
| 2008/0107244 A1* | 5/2008 | Setzer et al. | 379/88.12 |
| 2008/0120101 A1* | 5/2008 | Johnson et al. | 704/235 |
| 2008/0168168 A1* | 7/2008 | Hamilton et al. | 709/224 |

OTHER PUBLICATIONS

Fiscus et al. "The Rich Transcription 2006 Spring Meeting Recognition Evaluation", 2006.*
Richter et al. "Integrating Meeting Capture within a Collaborative Team Environment", 2001.*
Chiu et al. "LiteMinutes: An Internet-Based System for Multimedia Meeting Minutes" 2001.*
Bett et al. "Multimodal Meeting Tracker", 2000.*
Waibel et al. "Advances in Automatic Meeting Record Creation and Access", 2001.*
Nijholt et al. "Meetings and meeting modeling in smart environments", 2005.*
Reiter et al. "Multimodal Meeting Analysis by Segmentation and Classification of Meeting Events Based on a Higher Level Semantic Approach", 2005.*
Lay et al. "SOLO: An MPEG-7 Optimum Search Tool", 2000.*
Chen et al. "VACE Multimodal Meeting Corpus" 2006.*
Erol et al. "Multimodal Summarization of Meeting Recordings" 2003.*
Bouamrane et al. "Navigating Multimodal Meeting Recordings with the Meeting Miner" 2006.*
McCowan et al. "Automatic Analysis of Multimodal Group Actions in Meetings" 2005.*
Tucker et al. "Accessing Multimodal Meeting Data: Systems, Problems and Possibilities" 2005.*
Zschorn et al. "Transcription of Multiple Speakers Using Speaker Dependent Speech Recognition" 2003.*
Avrahami et al. "QnA: Augmenting an Instant Messaging Client to Balance User Responsiveness and Performance" 2004.*
International Search Report dated Jul. 23, 2009 from corresponding Application No. PCT/EP2008/050084, 7 pages.

* cited by examiner

FIG. 1     150

METHODS AND APPARATUS FOR MONITORING COMMUNICATION THROUGH IDENTIFICATION OF PRIORITY-RANKED KEYWORDS

FIELD OF INVENTION

The present invention generally relates to managing communications.

BACKGROUND OF THE INVENTION

Many people engage in communications using a variety of techniques. These techniques include telephone calls, emails, video- and tele-conferences, instant messaging, and the like. Often, the number of communications as well as the number of different types of communications can interfere with people's ability to properly process all the information contained in the communications.

Such problems are exacerbated by remote workers. Such workers are often on deadline and are receiving and transmitting information over a plurality of communication channels simultaneously. Collaboration and communication are key to the success of such workers, necessitating conference calls and other many-to-many communication forms. Indeed, it is not uncommon for a remote worker to be 'double-scheduled' and be a participant in two (or more) conference calls simultaneously.

Unfortunately, often people are not the focus of the communication even though they have information necessary for the success of the communication. For example, conference calls are a valuable communication tool, but often have many participants with little interest in much of the conversation. In such a situation, their attention can wander and focus on other communications or tasks. In the event that their input is then sought in the conference call, the person may be unable to contribute to the best of their ability without an understanding of the question, as well as the context of the question.

It is therefore a challenge to develop a method to manage communications to overcome these, and other, disadvantages.

SUMMARY OF THE INVENTION

A first embodiment of the invention includes a method for communication management. The method includes receiving at least one keyword and receiving a replay time span input. Further, the method includes receiving a plurality of communication inputs including at least a first communication input and a second communication input, monitoring at least the first communication input and second communication input for the at least one keyword, and determining an instantiation of the at least one keyword in at least one of the first communication input and second communication input. Additionally, the method includes associating the determined instantiation with one of the first communication input and second communication input, and providing at least a portion of the communication associated with the determined instantiation based on the replay time span input responsive to the instantiation.

A second embodiment of the invention includes a computer readable medium including computer readable code for communication management. The medium includes computer readable code for receiving at least one keyword and computer readable code for receiving a replay time span input. Further, the medium includes computer readable code for receiving a plurality of communication inputs including at least a first communication input and a second communication input, computer readable code for monitoring at least the first communication input and second communication input for the at least one keyword, and computer readable code for determining an instantiation of the at least one keyword in at least one of the first communication input and second communication input. Additionally, the medium includes computer readable code for associating the determined instantiation with one of the first communication input and second communication input, and computer readable code for providing at least a portion of the communication associated with the determined instantiation based on the replay time span input responsive to the instantiation.

Yet another aspect of the invention provides a system for communication management. The system includes means for receiving at least one keyword and means for receiving a replay time span input. Further, the system includes means for receiving a plurality of communication inputs including at least a first communication input and a second communication input, means for monitoring at least the first communication input and second communication input for the at least one keyword, and means for determining an instantiation of the at least one keyword in at least one of the first communication input and second communication input. Additionally, the system includes means for associating the determined instantiation with one of the first communication input and second communication input, and means for providing at least a portion of the communication associated with the determined instantiation based on the replay time span input responsive to the instantiation.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
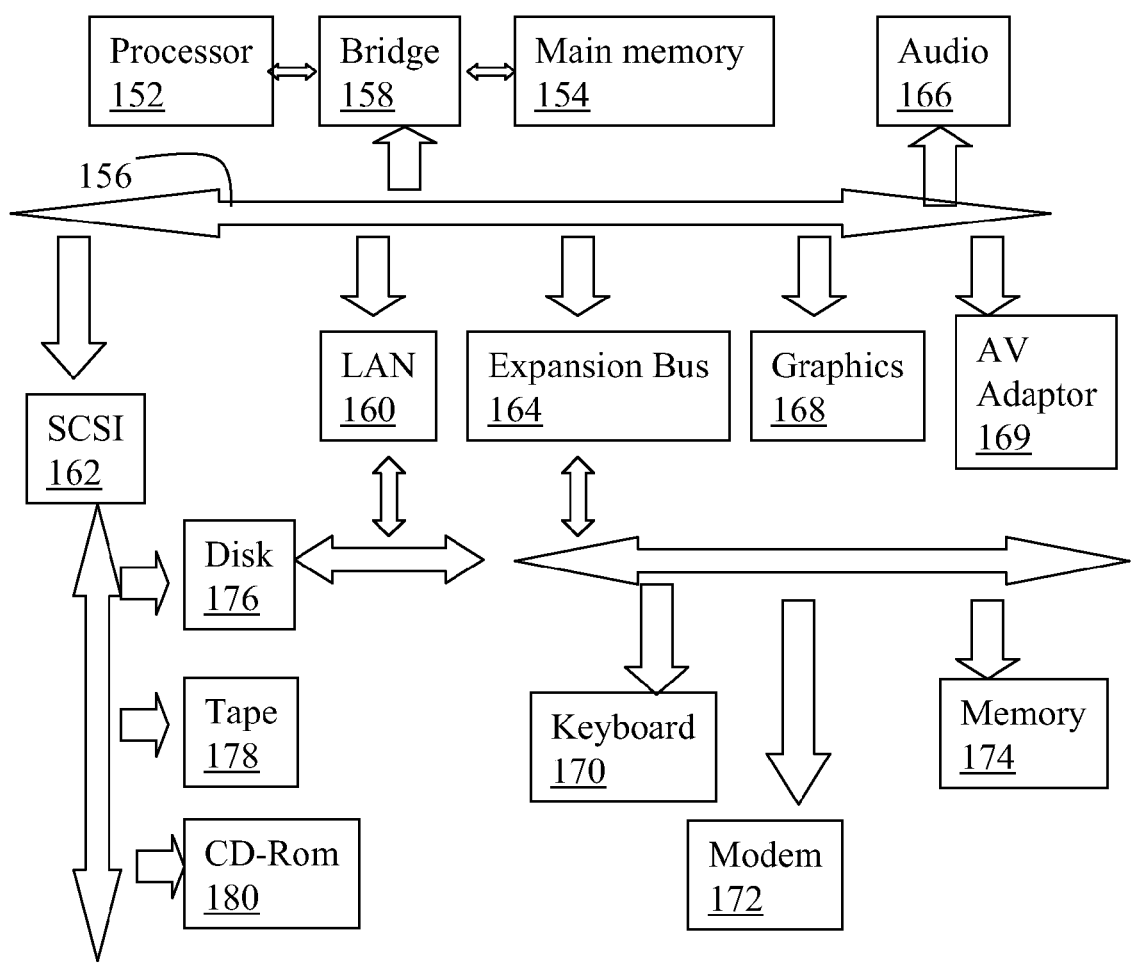
FIG. 1 illustrates one embodiment of a computer client, in accordance with one aspect of the invention.
Figure 2:
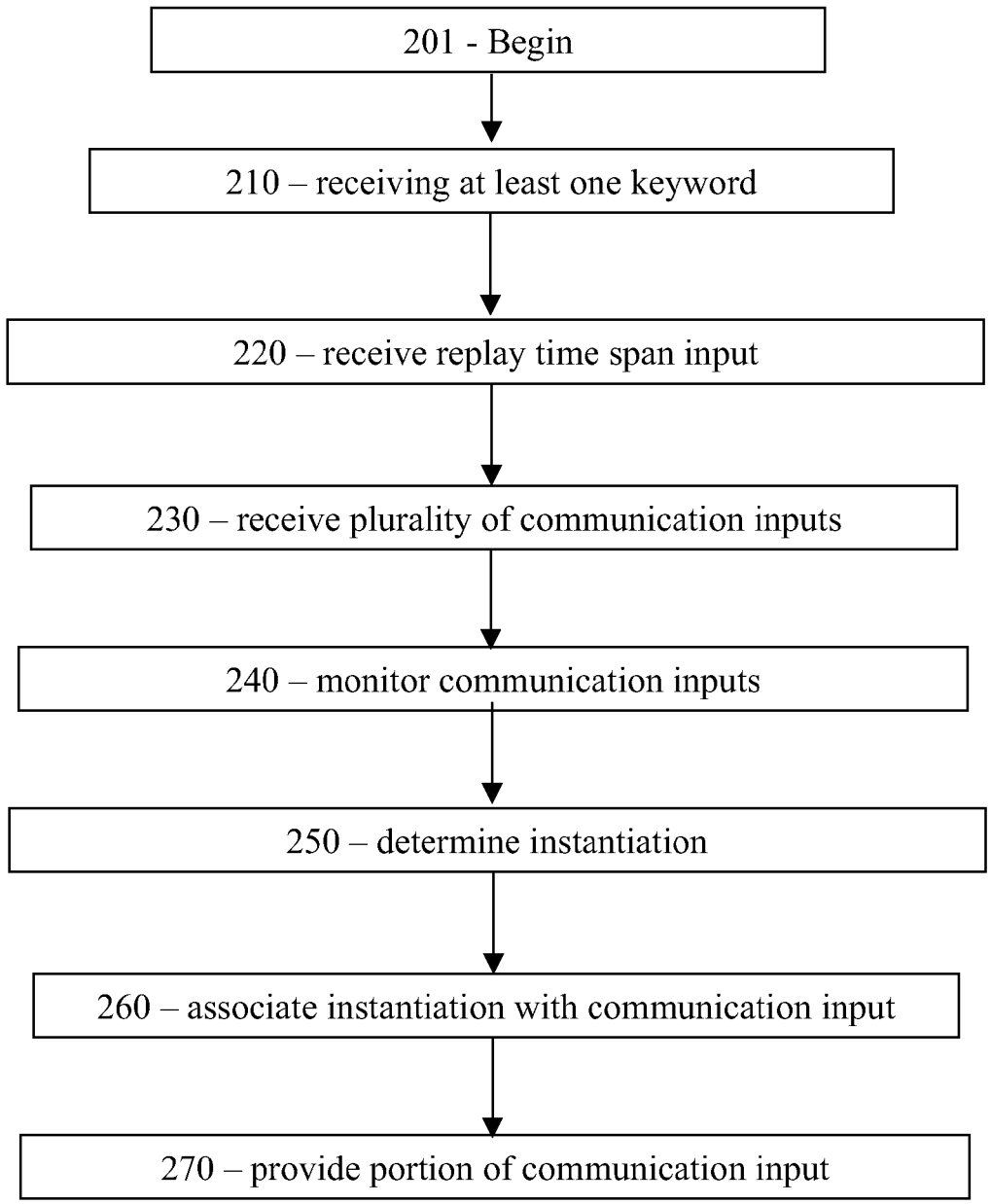
FIG. 2 illustrates one embodiment of a method for communication management, in accordance with one aspect of the invention.

FIG. 1 illustrates one embodiment of a computer 150 for use in accordance with one aspect of the invention. Computer 150 is an example of a master computer or target computer, such as computers 208, 210, and 212 (FIG. 2). Computer 150 employs a peripheral component interconnect (PCI) local bus architecture. Although the depicted example employs a PCI bus, other bus architectures such as Micro Channel and ISA may be used. PCI bridge 158 connects processor 152 and main memory 154 to PCI local bus 156. PCI bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer 150. The operating system may be any appropriate available operating system such as Windows, Macintosh, UNIX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 176 and may be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to multi-processor data processing system.

FIG. 2 illustrates a flowchart of a method 200 in accordance with one aspect of the invention. Method 200 begins at block 201, and receives at least one keyword at block 210. The keyword is any word or phrase input by a user as indicative of a high degree of interest to the user. Exemplary key words include the user's name, job, projects and the like. The keyword can be received at a central location, such as a server, or at a user's device.

In addition to keywords, in one embodiment, a priority ranking is received. In one embodiment, the priority ranking serves to weight keywords according to a user's preference. In one embodiment, a default priority ranking is assigned to each keyword for which a user does not specify a particular priority ranking. For example, a user can rank their name as highest priority, their project as a secondary ranking, etc. Additionally, the priority ranking can be associated with a type of communications, as discussed in more detail below. In one embodiment, a priority ranking is subject to override based on either a particular instantiation of a communication, a user input, or other factor. The priority ranking is, in one embodiment, scaled on a predetermined scale, such as 1 to 100.

At least one replay time span input is received at block 220. The replay time span input is data indicative of how much information to play. Each keyword can be associated with a distinct replay time span input, or a generic replay time span input can be associated with all keywords. For example, a three second replay time span input will result in three second of communication replay upon an instantiation of the keyword, as described in more detail below.

A plurality of communication inputs, including at least a first communication input and a second communication input, is received at block 230. A communication input is a source of communication, such as a phone call, conference call, email, instant message, Voice over Internet Protocol ("VOIP"), video conference, or the like. In one embodiment, each communication input is received at a distinct port of a computer or other such computing device, although this is not a requirement of the invention. The communication can be audio, visual, audiovisual, textual or the like. In one embodiment, each communication input is associated with a priority ranking responsive to the source of communications. The priority ranking can be associated with a particular instance of a communication, or with a source of communication. For example, a particular phone call could be of utmost importance, and have a high priority ranking. Alternatively, in another example, instant messaging communications generally could be considered of utmost importance, and instant messaging communications generally can have a high priority ranking. In another embodiment, a podcast, or other such time shifted communication stream, receives a relatively low priority ranking.

Each communication input is monitored for the at least one keyword at block 240. The monitoring can include parsing text, operating a speech recognition engine or the like. In addition, the monitoring can include "tapping" or intercepting signals from each port receiving a communication input or receiving a signal from an application associated with the communication input (i.e. receiving a signal from an instantiation of an instant messaging program executing an instant messaging communication).

Based on the monitoring, method 200 determines an instantiation of at least one keyword in at least one of the first communication input and second communication input at block 250. The instantiation of a keyword is determined by comparing, using any appropriate technique, the communication over the communication input with the list of received keywords. In one embodiment, the determination of an instantiation of the keyword includes determining an audible communication input, directing the at least one audible communication input to a speech recognition engine, receiving output from the speech recognition engine, and monitoring the received output for the keyword.

Based on the comparison, the instantiation is associated with the communication input at block 260.

Responsive to the instantiation of the keyword, method 200 provides at least a portion of the communication associated with the communication input associated with the instantiation based on the replay time span input at block 270. For example, if the replay time span input is 3 seconds, and the communication input is a phone call, the 3 seconds immediately prior to the instantiation are replayed for the user. In another example, the previous 3 seconds of text are displayed and/or highlighted. In yet another example, the replay time span input can be based on a number of lines of text, or a number of distinct text entries, such as instant messaging messages. In yet another embodiment, providing the portion of the communication includes adjusting a volume of the associated communication input.

In one embodiment, method 200 provides a means of raising a communications stream on instantiation of a keyword and provides an instant replay of predetermined time span of the communications stream leading up to the instantiation. In one embodiment, method 200 provides a transcript of the communications stream and highlights the transcript based on the instantiation of the keyword.

In one embodiment, the method determines an active window. An active window is a window that a user is actively using to send and receive communications. In addition, in certain embodiments, the method further determines whether the active window is associated with the instantiation of the keyword, and switches the active window to the window associated with the instantiation of the keyword based on the determination.

In one embodiment, communications received from each of the plurality of communication inputs are recorded and a text transcript of any audio or audiovisual communication input is prepared based on the recording. The text transcript is then stored and made accessible to a user. In one embodiment, the text transcript is made available to a central location for supervisor monitoring of calls.

In one embodiment, receiving the keyword as in block 210 includes receiving an audible input and wherein determining the instantiation as in block 250 includes comparing at least one of the first communication input and second communication input and the received audible input.

In one embodiment, user defined rules for communication management, keywords and priorities are received. Upon instantiation of a communication stream through a communication input, the conversion of any non-textual communications into text begins and the converted text is monitored for the keywords. In addition, any textual communications are monitored, although conversion is only necessary to convert any formatting differences that might be appropriate. Formatting differences can include differences between application data formats, language issues (such as translation from a language not understood by the user to a language that is understood by the user, or alternatively, translation from a language not understood by the machine to a language that is understood by the machine). In certain embodiments, a transcript of each communication is maintained in a continuous and/or unobtrusive manner for each audio and/or audiovisual communication. Upon a detection of a keyword, the system enters a trigger state in which an action is taken based on the instantiation of the keyword. The action taken in the trigger state can include increasing an audio level of the associated communication stream, playing a predefined audio tone responsive to the instantiation, providing a tactile alert to a user, providing a visual alert (such as flashing or the like), and providing a text display including highlighted keywords. Based on the actions taken in the trigger state, the system receives instructions from the user, such as to replay the immediately prior communications in the associated communication stream, for instance the replay time input prior to the instantiation.

Figure 3:
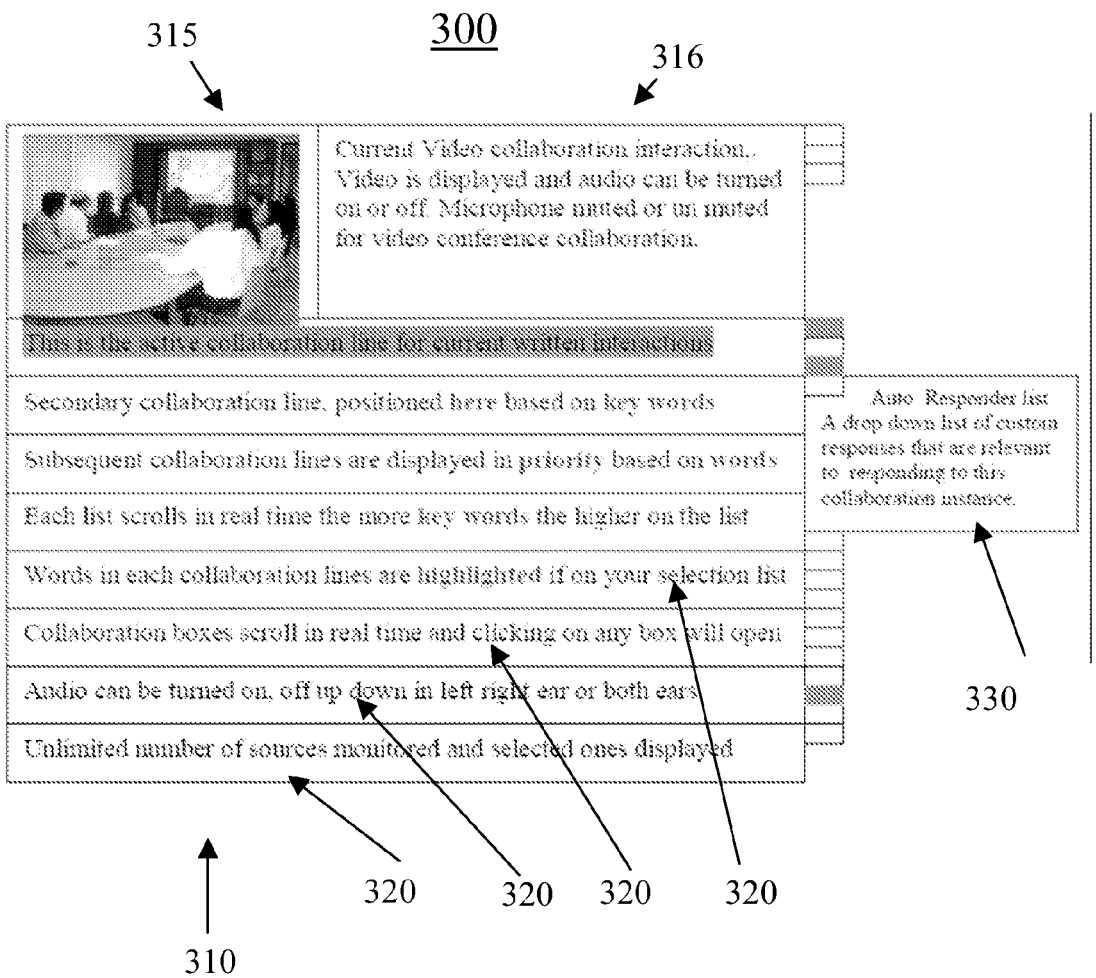
FIG. 3 illustrates one embodiment of a graphical user interface, in accordance with one aspect of the invention.

FIG. 3 illustrates one embodiment of a GUI 300 in accordance with one aspect of the invention. GUI 300 includes a plurality of displayed communication streams 310, including videoconference 315 and a plurality of communication windows 320. As shown in FIG. 3, a transcript 316 of the audio portion of videoconference 315 appears adjacent the video portion. Each communication window displays communications associated with a single communication stream. Depending on the communication source, the display can either display the communication as sent, or display a transcript of the communication, in real time or delayed. In addition, auto responder list 330 is accessible with a button press adjacent to each communication window, in the embodiment illustrated in FIG. 3. In other embodiments, the auto responder list 330 is displayed upon instantiation of a keyword in a communication stream. The auto responder list 330, in one embodiment, includes a plurality of actions that a user can take responsive to an instantiation of a keyword, including for example, replay a portion of the communication, increase the volume of the communication, provide a form response (e.g. "Here", "The project is progressing", or the like), or set a pre-scripted response in advance of an instantiation of a keyword (e.g. "I've stepped away for a moment").

Using the disclosures contained herein, a communication management system can be constructed to increase a users ability to manage communications. For example, an exemplary user with a short deadline for a report becomes a mandatory participant in a conference call. Although this exemplary user is a tangential participant in the call and not an active participant, attendance is mandatory and likely to interfere with preparation of the report. Use of the disclosures herein allows the exemplary user to participate in the conference call pending use of keywords that would likely trigger involvement, such as the user's name or project. Upon instantiation of a pre-selected keyword, the user is prompted with the information and given a chance for a quick replay of the communication immediately prior to the instantiation, in audio, text, or both, or another action. Such option can reduce situations where a user's name, for example, is called out several times during a conference call without a response from the user—an event which is embarrassing for the user and unnecessarily occupies the time of the other call participants.

The invention can take the form of an entirely hardware embodiment, an entirely software embodiment, or an embodiment containing both hardware and software elements. For example, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk. A GUI as disclosed herein can be constructed from any appropriate language, including but not limited to, Java, C, C++, Sametime, or the like.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for managing communications during one or more conference calls, the method comprising:

receiving, by a computer at a central location, a first keyword corresponding to a phrase having a high degree of interest to a user, the first keyword having a weight determined by a first priority ranking assigned to the first keyword and representative of user preference and/or communication type;

receiving, by the computer, a second keyword having a weight determined by a second priority ranking assigned to the second keyword and representative of user preference and/or communication type, wherein the first priority ranking of the first keyword is greater than the second priority ranking of the second keyword;

receiving, by the computer, a replay time span associated with the first keyword;

identifying an instantiation of the first keyword by directing communication generated during the one or more conference calls to a speech recognition engine and monitoring output of the speech recognition engine;

upon identifying the instantiation of the first keyword, replaying a section of the communication corresponding to the first keyword to the user for a period of time equal to the replay time span;

converting the section of the communication into text and formatting the text to highlight text portions that correspond to the first keyword; and transmitting the formatted text to the user, further comprising receiving the first priority ranking, wherein the first keyword and the first priority ranking assigned to the first keyword are received from the user, wherein first and second conference calls are included in the one or more conference calls, wherein the output of the speech recognition engine includes first output corresponding to the first conference call and second output corresponding to the second conference call, wherein identifying the instantiation of the first keyword comprises identifying the instantiation of the first keyword in the first output corresponding to the first conference call, and wherein the method further comprises:

identifying an instantiation of the second keyword in the second output corresponding to the second conference call; and determining, based, at least in part, on the first priority ranking assigned to the first keyword and the second priority ranking assigned to the second keyword, how to display the formatted text corresponding to the first keyword and formatted text corresponding to the second keyword.

2. The method of claim 1, further comprising:

prior to identifying the instantiation of the first keyword and the second keyword, translating the section of the communication corresponding to the first keyword from a first language to a second language.

3. A non-transitory computer usable medium storing computer readable code, that, when executed, performs a method for communication management, the method comprising:

receiving, by a computer at a central location, a first keyword corresponding to a phrase having a high degree of interest to a user, the first keyword having a weight determined by a first priority ranking assigned to the first keyword and representative of user preference and/or communication type;

receiving, by the computer, a second keyword having a weight determined by a second priority ranking assigned to the second keyword and representative of user preference and/or communication type, wherein the first priority ranking of the first keyword is greater than the second priority ranking of the second keyword;

receiving, by the computer, a replay time span associated with the first keyword;

identifying an instantiation of the first keyword by directing communication generated during one or more conference calls to a speech recognition engine and monitoring output of the speech recognition engine;

upon identifying the instantiation of the first keyword, replaying a section of the communication corresponding to the first keyword to the user for a period of time equal to the replay time span;

converting the section of the communication into text and formatting the text to highlight text portions that correspond to the first keyword; and transmitting the formatted text to the user, wherein the method further comprises receiving the first priority ranking, and wherein the first keyword and the first priority ranking assigned to the first keyword are received from the user, wherein first and second conference calls are included in the one or more conference calls, wherein the output of the speech recognition engine includes first output corresponding to the first conference call and second output corresponding to the second conference call, wherein identifying the instantiation of the first keyword comprises identifying the instantiation of the first keyword in the first output corresponding to the first conference call, and wherein the method further comprises:

identifying an instantiation of the second keyword in the second output corresponding to the second conference call; and determining, based, at least in art on the first priority ranking assigned to the first keyword and the second priority ranking assigned to the second keyword, how to display the formatted text corresponding to the first keyword and formatted text corresponding to the second keyword.

4. The computer usable medium of claim 3, wherein the method further comprises:

prior to identifying the instantiation of the first keyword and the second keyword, translating the section of the communication corresponding to the first keyword from a first language to a second language.

5. A system for communication management, the system comprising:

one or more processors; and a storage device encoded with instructions that, when executed by the one or more processors, cause the system to execute a method comprising:

receiving, by the system at a central location, a first keyword corresponding to a phrase having a high degree of interest to a user, the first keyword having a weight determined by a first priority ranking assigned to the first keyword and representative of user preference and/or communication type;

receiving, by the system, a second keyword having a weight determined by a second priority ranking assigned to the second keyword and representative of user preference and/or communication type, wherein the first priority ranking of the first keyword is greater than the second priority ranking of the second keyword;

receiving, by the system, a replay time span associated with the first keyword;

identifying an instantiation of the first keyword by directing communication generated during one or more conference calls to a speech recognition engine and monitoring output of the speech recognition engine;

upon identifying the instantiation of the first keyword, replaying a section of the communication corresponding to the first keyword to the user for a period of time equal to the replay time span;

converting the section of the communication into text and formatting the text to highlight text portions that correspond to the first keyword; and transmitting the formatted text to the user, wherein the method further comprises receiving the first priority ranking, and wherein the first keyword and the first priority ranking assigned to the first keyword are received from the user, wherein first and second conference calls are included in the one or more conference calls, wherein the output of the speech recognition engine includes first output corresponding to the first conference call and second output corresponding to the second conference call, wherein identifying the instantiation of the first keyword comprises identifying the instantiation of the first keyword in the first output corresponding to the first conference call, and wherein the method further comprises:
identifying an instantiation of the second keyword in the second output corresponding to the second conference call; and determining, based, at least in part, on the first priority ranking assigned to the first keyword and the second priority ranking assigned to the second keyword, how to display the formatted text corresponding to the first keyword and formatted text corresponding to the second keyword.

6. The system of claim 5, wherein the method further comprises:
prior to identifying the instantiation of the first keyword and the second keyword, translating the section of the communication corresponding to the first keyword from a first language to a second language.

\* \* \* \* \*